(12) United States Patent
Jo et al.

(10) Patent No.: US 12,134,559 B2
(45) Date of Patent: Nov. 5, 2024

(54) HYDROGEN PURIFICATION/STORAGE APPARATUS AND METHOD USING LIQUID ORGANIC HYDROGEN CARRIER

(71) Applicant: KOREA INSTITUTE OF SCIENCE AND TECHNOLOGY, Seoul (KR)

(72) Inventors: Young Suk Jo, Seoul (KR); Yong Ha Park, Seoul (KR); Yeong Cheon Kim, Seoul (KR); Hyang Soo Jeong, Seoul (KR); Yong Min Kim, Seoul (KR); Hyun Tae Sohn, Seoul (KR); Chang Won Yoon, Seoul (KR); Suk Woo Nam, Seoul (KR); Jong Hee Han, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 1018 days.

(21) Appl. No.: 17/101,140

(22) Filed: Nov. 23, 2020

(65) Prior Publication Data

US 2021/0188630 A1 Jun. 24, 2021

(30) Foreign Application Priority Data

Dec. 19, 2019 (KR) .................. 10-2019-0170353

(51) Int. Cl.
*C01B 3/00* (2006.01)
*B01J 8/00* (2006.01)
*C01B 3/54* (2006.01)

(52) U.S. Cl.
CPC .......... *C01B 3/0015* (2013.01); *B01J 8/0005* (2013.01); *C01B 3/54* (2013.01); *B01J 2208/00539* (2013.01); *B01J 2208/00548* (2013.01); *C01B 2203/0435* (2013.01); *C01B 2203/1058* (2013.01); *C01B 2203/1064* (2013.01); *C01B 2203/1633* (2013.01)

(58) Field of Classification Search
CPC . C01B 3/0015; C01B 3/54; C01B 2203/0435; C01B 2203/1058; C01B 2203/1064; C01B 2203/1633; C01B 2203/107; C01B 3/26; C01B 3/0005; B01J 8/0005; B01J 2208/00539; B01J 2208/00548; B01J 19/08; B01J 21/04; B01J 23/462; Y02E 60/32; C07C 15/06; C07C 211/54; F17C 5/06; F17C 13/04; F17C 2205/0323; F17C 2221/012; F17C 2227/0157

See application file for complete search history.

(56) References Cited

U.S. PATENT DOCUMENTS 5,093,535 A * 3/1992 Harrison ............... C07C 29/141
554/146
6,802,875 B1 * 10/2004 Kimbara .................. C01B 3/26
48/85.1

(Continued)

FOREIGN PATENT DOCUMENTS

JP 2002134141 A 5/2002
JP 2019534778 A 12/2019

(Continued)

*Primary Examiner* — Wayne A Langel
*Assistant Examiner* — Syed T Iqbal
(74) *Attorney, Agent, or Firm* — Rabin & Berdo, P.C.

(57) ABSTRACT

The present disclosure relates to a hydrogen purification/storage apparatus and method using a liquid organic hydrogen carrier (LOHC).

20 Claims, 5 Drawing Sheets

(56) References Cited

U.S. PATENT DOCUMENTS

2006/0204799 A1* 9/2006 Ishikawa ................ C01B 3/501
                                                            429/444
2017/0008762 A1*  1/2017 Arlt ....................... C10G 45/56
2017/0283257 A1* 10/2017 Milstein ................ C07C 249/02
2019/0358602 A1* 11/2019 Tames ...................... B01J 3/03

FOREIGN PATENT DOCUMENTS

| KR | 10-2017-0032977 A | 3/2017 |
| KR |    1020170052618 A | 5/2017 |
| KR |      10-1845515 B1 | 4/2018 |
| KR | 10-2019-0069418 A | 6/2019 |
| KR |      10-1987553 B1 | 6/2019 |
| KR | 10-2019-0083546 A | 7/2019 |

* cited by examiner

HYDROGEN PURIFICATION/STORAGE APPARATUS AND METHOD USING LIQUID ORGANIC HYDROGEN CARRIER

CROSS-REFERENCE TO RELATED APPLICATION

This application claims, under 35 U.S.C. § 119(a), the benefit of priority to Korean Patent Application No. 10-2019-0170353 filed on Dec. 19, 2019, the entire contents of which are incorporated herein by reference.

BACKGROUND

(a) Technical Field

The present disclosure relates to a hydrogen purification/storage apparatus and method using a liquid organic hydrogen carrier (LOHC).

(b) Background Art

Demand for new renewable energy is high due to depletion of fossil fuels and environmental pollution; however, new renewable energy has problems of imbalance between supply and demand, a long distance between a production place and a demand place, etc., and therefore an efficient energy storage method is required. For this reason, hydrogen, which has a high ratio of energy density to weight and is capable of stably storing a large amount of energy for a long time, has attracted attention as a new renewable energy carrier. In particular, a fuel cell and a hydrogen combustion apparatus use hydrogen as a reaction gas. In order to use the fuel cell and the hydrogen combustion apparatus in vehicles or various kinds of electronic products, for example, technology capable of stably and continuously supply high-purity hydrogen is required.

In an apparatus using hydrogen, a method of receiving hydrogen from a separately installed hydrogen purification/storage apparatus (hydrogen supply apparatus) whenever hydrogen is necessary may be used in order to supply hydrogen. Representative examples thereof include a compressed hydrogen storage method and a liquefied hydrogen storage method. These methods may have issues related to price and safety in transporting hydrogen from a hydrogen production place to a hydrogen demand place.

In addition, a method of loading a material capable of storing and generating hydrogen in an apparatus using hydrogen, generating hydrogen through reaction of the material, and supplying the same may be used. A method of using a metal hydride, a method of using absorbents/carbon, and a chemical hydrogen storage method have been proposed as examples of this method, and research on hydrogen storage technology using various chemical hydrides, such as ammonia borane, a silane compound, and formic acid, has been conducted.

Research on a material capable of storing hydrogen has been actively conducted; however, research on an overall process or system capable of selectively storing hydrogen from a mixed gas using the same to simultaneously perform hydrogen purification and storage is insufficient.

PRIOR ART DOCUMENT

[Patent Document]
(Patent Document 1) Korean Registered Patent No. 10-1845515

The above information disclosed in this Background section is provided only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art.

It is an object of the present invention to provide a hydrogen purification/storage apparatus and method capable of economically storing a large amount of hydrogen.

It is another object of the present invention to provide a hydrogen purification/storage apparatus and method capable of using hydrogen that is supplied irrespective of the state thereof.

The objects of the present invention are not limited to those described above. The objects of the present invention will be clearly understood from the following description and could be implemented by means defined in the claims and a combination thereof.

In one aspect, the present invention provides a hydrogen purification/storage apparatus including a hydrogen supply unit, a reaction unit connected to the hydrogen supply unit via a hydrogen supply line, the reaction unit including a hydrogen storage material and a catalyst configured to accelerate hydrogenation of the hydrogen storage material, and a compressor installed in the hydrogen supply line, the compressor being configured to compress hydrogen supplied from the hydrogen supply unit, wherein the hydrogen storage material includes a liquid organic hydrogen carrier (LOHC).

The hydrogen supply unit may supply pure hydrogen or a mixed gas including hydrogen and an impurity selected from the group consisting of nitrogen ($N_2$), carbon oxide, hydrocarbon, oxygen ($O_2$), and a combination thereof.

The hydrogen purification/storage apparatus may further include no hydrogen purification unit.

The hydrogen supply line may include a first hydrogen supply line configured to interconnect the hydrogen supply unit and the compressor, a second hydrogen supply line configured to interconnect the compressor and the reaction unit, and a third hydrogen supply line configured to interconnect the compressor and the reaction unit along a path different from the path of the second hydrogen supply line, the third hydrogen supply line having a buffer tank.

The hydrogen supply line may further include a bypass line configured to interconnect the first hydrogen supply line and the second hydrogen supply line, the bypass line being configured to bypass the compressor.

When the pressure of hydrogen supplied from the hydrogen supply unit is equal to or higher than a predetermined pressure value, a valve installed in each of the first hydrogen supply line and the second hydrogen supply line may be opened such that the hydrogen is supplied to the first hydrogen supply line and the second hydrogen supply line.

When the pressure of hydrogen supplied from the hydrogen supply unit is lower than the predetermined pressure value, the compressor may compress the hydrogen and supply the compressed hydrogen, and a valve installed in each of the first hydrogen supply line and the third hydrogen supply line may be opened such that the compressed hydrogen is supplied to the first hydrogen supply line and the third hydrogen supply line.

The liquid organic hydrogen carrier (LOHC) may include any one selected from the group consisting of biphenyl dissolved in diphenylmethane, N-ethylcarbazole, dibenzyl toluene, toluene, and a combination thereof.

The catalyst may include a catalyst metal selected from the group consisting of ruthenium (Ru), nickel (Ni), palladium (Pd), platinum (Pt), and a combination thereof.

The reaction unit may be operated at a temperature of 20° C. to 150° C. and a pressure of 10 bar to 50 bar.

The reaction between the hydrogen storage material and the hydrogen in the reaction unit may be performed in a closed system.

The hydrogen purification/storage apparatus may further include a pressure measurement unit installed at the reaction unit, the pressure measurement unit being configured to measure the pressure of the reaction unit.

The hydrogen purification/storage apparatus may further include a storage unit connected to the reaction unit, the storage unit being configured to store a product in the reaction unit.

The hydrogen purification/storage apparatus may further include a hydrogen storage material supply unit connected to the reaction unit, the hydrogen storage material supply unit being configured to supply a hydrogen storage material to the reaction unit.

The hydrogen purification/storage apparatus may further include a purge gas supply unit communicating with the second hydrogen supply line, the purge gas supply unit being configured to supply a purge gas to the reaction unit, wherein residual gas in the reaction unit may be discharged outside via the third hydrogen supply line and a purge gas discharge line communicating therewith by the purge gas.

In another aspect, the present invention provides a hydrogen purification/storage method including reacting hydrogen supplied from the hydrogen supply unit to the reaction unit and a hydrogen storage material in the reaction unit with each other.

When the pressure of hydrogen supplied from the hydrogen supply unit is equal to or higher than a predetermined pressure value, the hydrogen may be supplied to a first hydrogen supply line configured to interconnect the hydrogen supply unit and the compressor and a second hydrogen supply line configured to interconnect the compressor and the reaction unit.

When the pressure of hydrogen supplied from the hydrogen supply unit is lower than the predetermined pressure value, the hydrogen may be compressed and supplied to the first hydrogen supply line and a third hydrogen supply line configured to interconnect the compressor and the reaction unit along a path different from the path of the second hydrogen supply line, the third hydrogen supply line having a buffer tank.

The hydrogen purification/storage method may further include injecting a purge gas into the reaction unit to discharge residual gas in the reaction unit to the outside before supplying hydrogen to the hydrogen supply unit.

The reaction between the hydrogen storage material and the hydrogen in the reaction unit may be performed in a closed system, and when the pressure in the reaction unit reaches a predetermined value, the reaction unit may be opened to move a product in the reaction unit to a storage unit connected to the reaction unit.

A new hydrogen storage material may be supplied to the reaction unit after the product in the reaction unit is moved to the storage unit.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
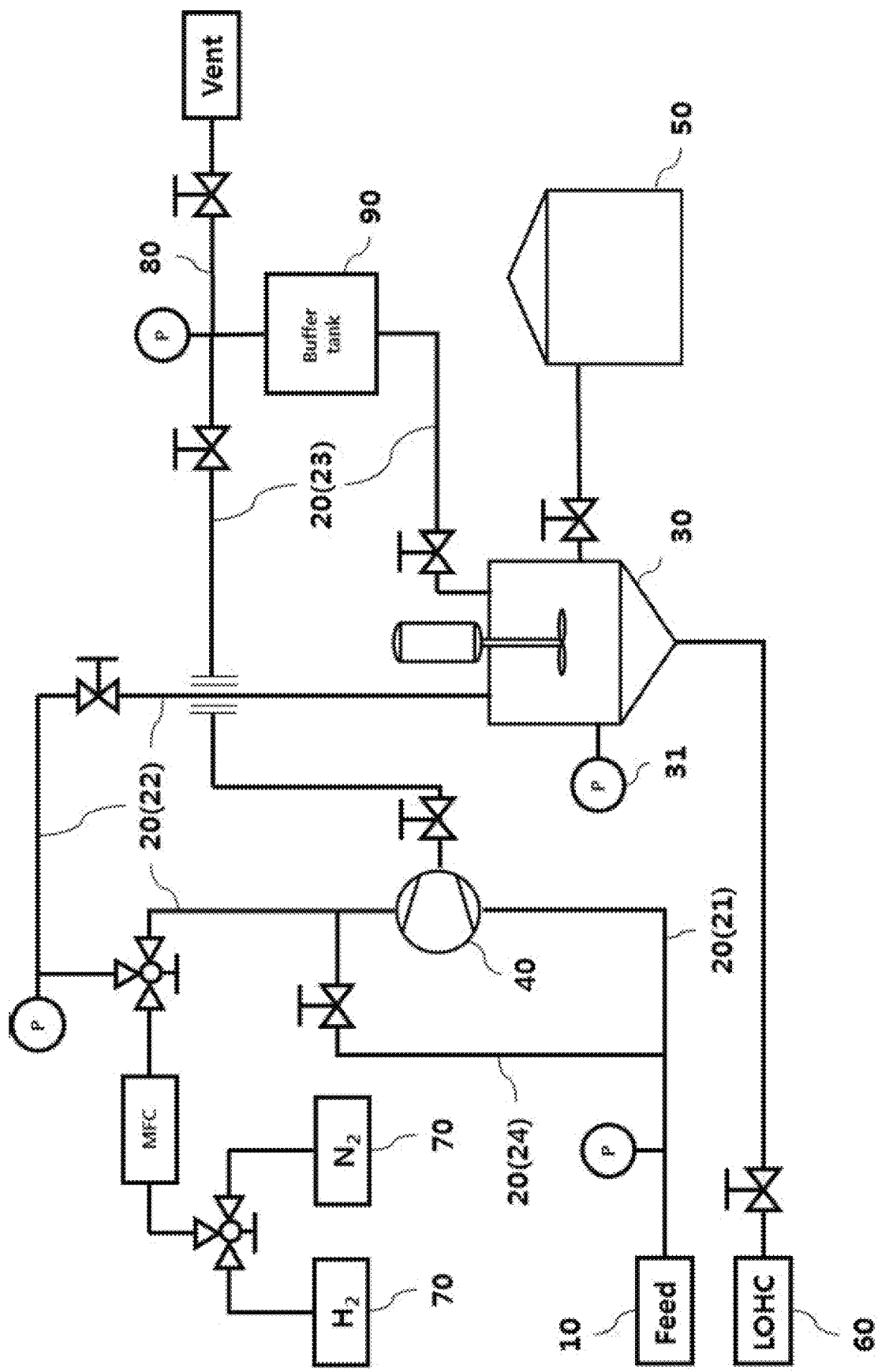
FIG. 1 is a process view schematically showing a hydrogen purification/storage apparatus using a liquid organic hydrogen carrier (LOHC) according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

The objects described above, and other objects, features and advantages will be clearly understood from the following preferred embodiments with reference to the attached drawings. However, the present invention is not limited to the embodiments and will be embodied in different forms. The embodiments are suggested only to offer thorough and complete understanding of the disclosed contents and sufficiently inform those skilled in the art of the technical concept of the present invention.

Like reference numbers refer to like elements throughout the description of the figures. In the drawings, the sizes of structures are exaggerated for clarity. It will be understood that, although the terms "first", "second", etc. may be used herein to describe various elements, corresponding elements should not be understood to be limited by these terms, which are used only to distinguish one element from another. For example, within the scope defined by the present invention, a first element may be referred to as a second element and similarly, a second element may be referred to as a first element. Singular forms are intended to include plural forms as well, unless the context clearly indicates otherwise.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" should modify all numbers, figures and/or expressions. In addition, when numeric ranges are disclosed in the description, these ranges are continuous and include all numbers from the minimum to the maximum including the maximum within the range unless otherwise defined. Furthermore, when the range refers to an integer, it includes all integers from the minimum to the maximum including the maximum within the range, unless otherwise defined.

FIG. 1 is a process view schematically showing a hydrogen purification/storage apparatus using a liquid organic hydrogen carrier (LOHC) according to the present invention. Referring to this figure, the hydrogen purification/storage apparatus includes a hydrogen supply unit 10, a reaction unit 30 connected to the hydrogen supply unit 10 via a hydrogen supply line 20, the reaction unit 30 including a hydrogen storage material and a catalyst configured to accelerate hydrogenation of the hydrogen storage material, and a compressor 40 installed in the hydrogen supply line 20, the compressor 40 being configured to compress hydrogen supplied from the hydrogen supply unit 10.

The hydrogen supply unit 10 may supply pure hydrogen. However, the present invention is not limited thereto. The hydrogen supply unit 10 may supply a mixture of hydrogen and an impurity selected from the group consisting of nitrogen ($N_2$), carbon oxide, hydrocarbon, oxygen ($O_2$), and a combination thereof. In the present invention, hydrogen is stored through hydrogenation of a liquid organic hydrogen carrier (LOHC). That is, even in the case in which the above mixed gas is supplied, only hydrogen selectively reacts with the liquid organic hydrogen carrier (LOHC), and therefore there is no limitation in supply gas. Hereinafter, in describing the present invention, "hydrogen" may mean a kind of feed supplied from the hydrogen supply unit 10 to the reaction unit 30, and the feed may be interpreted as pure hydrogen or the above mixed gas.

Also, in the present invention, since the liquid organic hydrogen carrier (LOHC) selectively stores hydrogen, as described above, a separate purification unit configured to purify supply gas is not required. Conventionally, in the case in which a mixed gas including hydrogen and an impurity is used as the feed, the hydrogen is purified from the mixed gas through pressure swing adsorption using a purification unit, is compressed, and is stored. In the present invention, hydrogen is selectively stored through hydrogenation of the liquid organic hydrogen carrier (LOHC), and therefore it is not necessary to provide the above purification unit or to perform a purification process. In storing high-purity hydrogen, therefore, the process may be simplified.

The hydrogen supply line 20 includes a first hydrogen supply line 21 configured to interconnect the hydrogen supply unit 10 and the compressor 40, a second hydrogen supply line 22 configured to interconnect the compressor 40 and the reaction unit 30, and a third hydrogen supply line 23 configured to interconnect the compressor 40 and the reaction unit 30 along a path different from the path of the second hydrogen supply line 22, the third hydrogen supply line 23 having a buffer tank 90.

In the present invention, the reason that the second hydrogen supply line 22 and the third hydrogen supply line 23 are configured as different paths is that it is necessary to select one of the paths depending on the pressure of the feed supplied from the hydrogen supply unit 10. Consequently, the hydrogen purification/storage apparatus according to the present invention is applicable irrespective of sources from which the feed is supplied. The detailed description thereof will be given below.

The hydrogen supply line 20 may further include a bypass line 24 configured to interconnect the first hydrogen supply line 21 and the second hydrogen supply line 22, the bypass line 24 being configured to bypass the compressor 40. This line is also provided to select a supply path of the feed depending on the pressure of the feed.

In the reaction unit 30, hydrogenation of the hydrogen storage material is performed.

The hydrogen storage material may be a material capable of reacting with a material including hydrogen (H) atoms, storing the hydrogen atoms through chemical bonding, and reversibly discharging hydrogen ($H_2$) when predetermined energy is applied.

The present invention is characterized in that a liquid organic hydrogen carrier (LOHC) is used as the hydrogen storage material. Consequently, it is possible to exclude a purification process, which is required in conventional hydrogen production and hydrogen purification/storage methods, and to safely supply hydrogen in large quantities, since hydrogen is capable of being stored in a liquid state.

The liquid organic hydrogen carrier (LOHC) may include any one selected from the group consisting of biphenyl dissolved in diphenylmethane, N-ethylcarbazole, dibenzyl toluene, toluene, and a combination thereof. The reaction unit 30 may include a catalyst configured to accelerate hydrogenation of the hydrogen storage material.

The catalyst may include a catalyst metal selected from the group consisting of ruthenium (Ru), nickel (Ni), and a combination thereof. In the catalyst, the catalyst metal may be supported on a ceramic support, such as alumina ($Al_2O_3$), zirconia ($ZrO_2$), or ceria ($CeO_2$), or a carbon support, such as carbon, carbon nanotube, or graphene.

In the reaction unit 30, hydrogenation of the hydrogen storage material may be performed at a temperature of 80° C. to 150° C. and a pressure of 30 bar to 50 bar. If the temperature of the reaction unit 30 is lower than the above range, the speed of hydrogenation may be reduced. If the temperature of the reaction unit 30 is higher than the above range, a compound may be decomposed. Also, if the pressure of the reaction unit 30 is lower than the above range, the speed of hydrogenation may be reduced. If the pressure of the reaction unit 30 is higher than the above range, economic effectiveness may be lowered.

Hydrogenation of the hydrogen storage material in the reaction unit 30 may be performed in a closed system. Consequently, the reaction unit 30 may be a kind of batch reactor.

The reaction unit 30 may further include a pressure measurement unit 31 configured to measure the pressure thereof. Since the reaction unit 30 is a closed system, as described above, the pressure in the reaction unit 30 becomes uniform when the hydrogenation is in equilibrium. Consequently, it is possible to determine whether the hydrogenation is finished by measuring the pressure of the reaction unit 30 in real time or at regular intervals using the pressure measurement unit 31.

The hydrogen purification/storage apparatus according to the present invention may further include a storage unit 50 connected to the reaction unit 30, the storage unit 50 being configured to store a product in the reaction unit 30.

When hydrogenation is finished, as described above, the reaction unit 30 may be opened, and a product in the reaction unit 30 may be moved to the storage unit 50 in order to store the product.

The storage unit 50 may be a storage tank or a transport means including a storage tank. However, the present invention is not limited thereto. Any storage unit 50 may be used as long as it is possible to provide sufficient space to store the product in the reaction unit 30.

The hydrogen purification/storage apparatus according to the present invention may further include a hydrogen storage material supply unit 60 connected to the reaction unit 30, the hydrogen storage material supply unit 60 being configured to supply a hydrogen storage material to the reaction unit 30.

After the product in the reaction unit 30 is moved to the storage unit 50, as described above, the hydrogen storage material supply unit 60 and the reaction unit 30 may communicate with each other to supply a new hydrogen storage material to the reaction unit 30.

The hydrogen purification/storage apparatus according to the present invention may further include a construction configured to supply a purge gas used to remove gas remaining in the reaction unit 30. When the hydrogen purification/storage apparatus is operated for the first time or before a new batch is commenced, it is necessary to remove gas remaining in the reaction unit 30, thereby further improving hydrogen storage efficiency.

The hydrogen purification/storage apparatus may further include a purge gas supply unit 70 communicating with the second hydrogen supply line 22, the purge gas supply unit 70 being configured to supply a purge gas to the reaction unit 30. The purge gas may be hydrogen ($H_2$) and/or nitrogen ($N_2$) although not being particularly restricted.

The purge gas may be supplied to the reaction unit 30 via the second hydrogen supply line 22, and the purge gas and residual gas in the reaction unit 30 are discharged to the outside via the third hydrogen supply line 23 and a purge gas discharge line 80 communicating therewith.

Hereinafter, a method of storing hydrogen using the hydrogen purification/storage apparatus will be described in detail.

A hydrogen purification/storage method using a liquid organic hydrogen carrier (LOHC) according to the present invention may include a step of reacting hydrogen supplied from the hydrogen supply unit 10 to the reaction unit 30 and a hydrogen storage material in the reaction unit 30 with each other.

At this time, the reaction between the hydrogen storage material and the hydrogen in the reaction unit 30 may be performed in a closed system. When the pressure in the reaction unit 30 reaches a predetermined value, the reaction unit 30 may be opened, and a product in the reaction unit 30 may be moved to the storage unit 50. Here, the "predetermined value" means equilibrium pressure of the hydrogenation or pressure approximate thereto, and an appropriate value may be selected in consideration of the kind of a hydrogen storage material that is used and the pressure of hydrogen that is supplied to the reaction unit 30.

The hydrogen purification/storage method may further include a step of allowing the hydrogen storage material supply unit 60 and the reaction unit 30 to communicate with each other to supply a new hydrogen storage material to the reaction unit 30 after moving the product in the reaction unit 30 to the storage unit 50.

Figure 2:
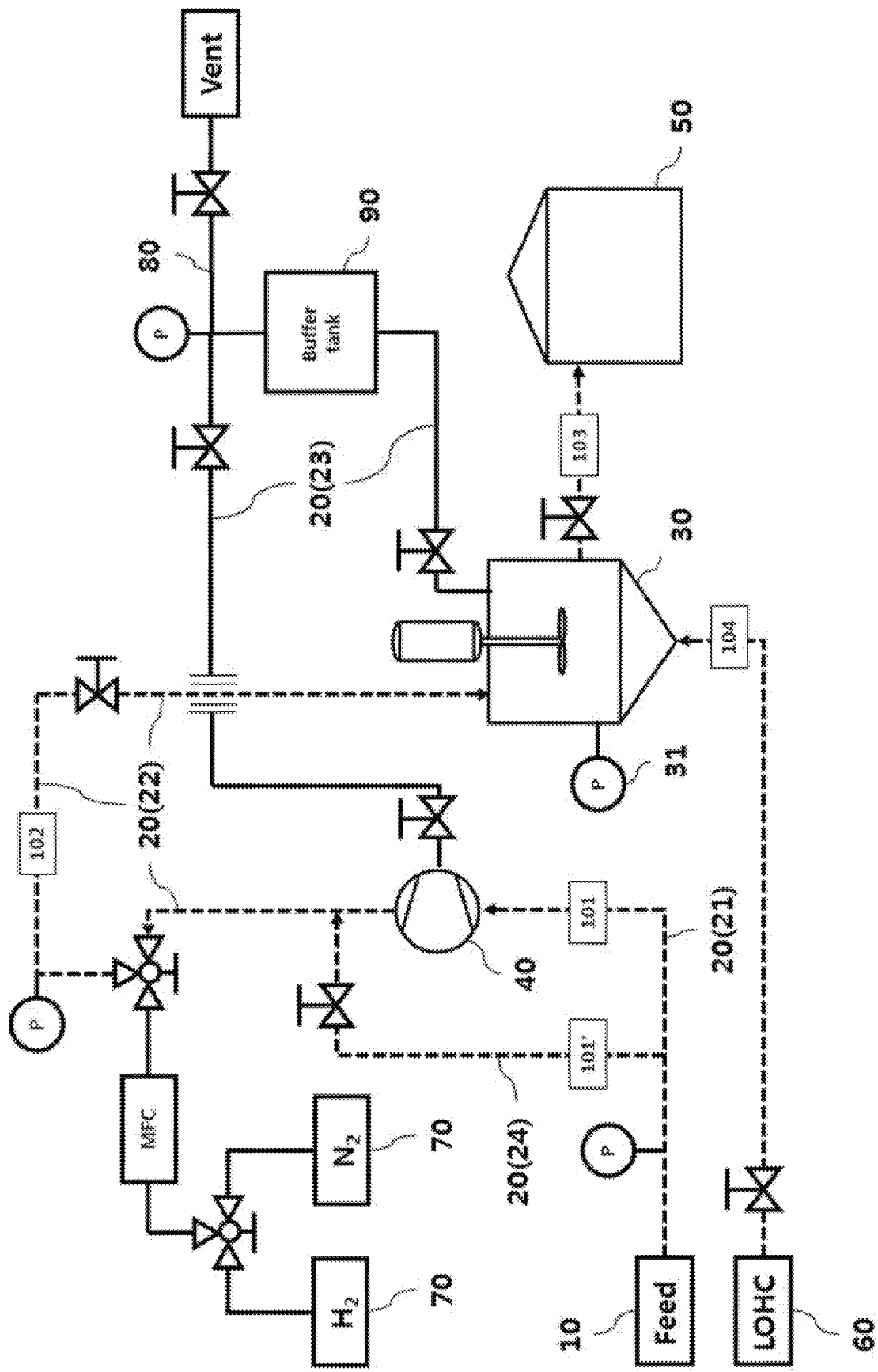
FIG. 2 is a reference view illustrating an embodiment of a hydrogen purification/storage apparatus and method according to the present invention.
Figure 3:
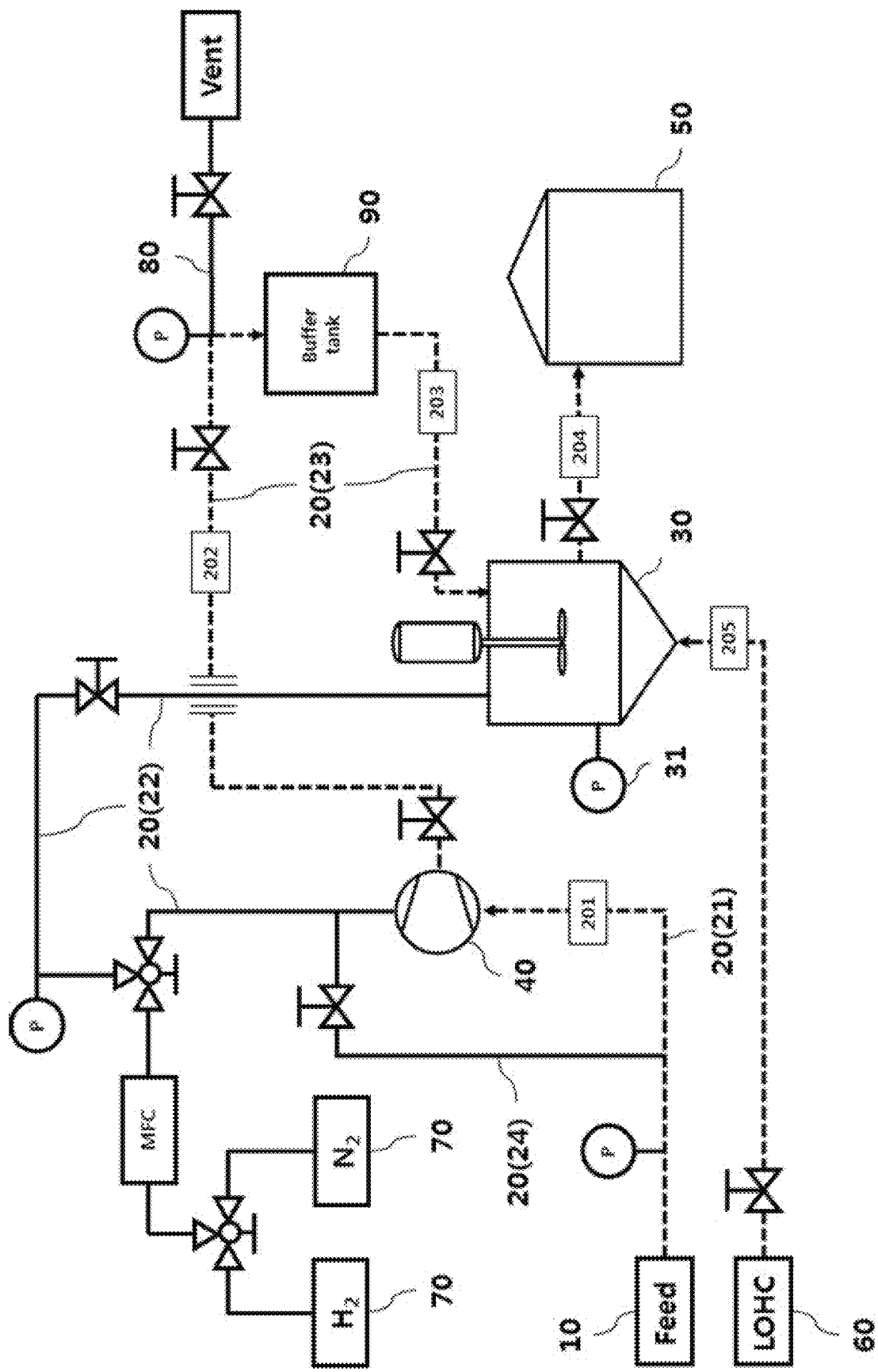
FIG. 3 is a reference view illustrating another embodiment of the hydrogen purification/storage apparatus and method according to the present invention.

In the present invention, one of the hydrogen supply lines may be appropriately selected depending on the pressure of a feed supplied from the hydrogen supply unit 10, and then the above process may be performed. FIGS. 2 and 3 are reference views illustrating the same.

FIG. 2 is a reference view illustrating the hydrogen purification/storage apparatus and method in the case in which the pressure of a feed supplied from the hydrogen supply unit 10 is equal to or higher than a predetermined value. Here, the "predetermined value" is not particularly restricted, and an appropriate value may be selected in consideration of operation pressure of the reaction unit 30. In addition, the pressure of the feed may be measured using a pressure measurement instrument installed at the hydrogen supply unit 10.

First, a feed is supplied from the hydrogen supply unit 10 to the compressor 40 via the first hydrogen supply line 21 (101).

The compressor 40 supplies the feed to the second hydrogen supply line 22 without compressing the feed, or compresses the feed to the extent to which the pressure of the feed to be reduced during movement to the reaction unit 30 is offset and supplies the feed to the second hydrogen supply line 22 such that the feed is supplied to the reaction unit 30 (102).

In the case in which the pressure of the feed is sufficiently higher than the predetermined value, however, the feed may flow to the second hydrogen supply line 22 via the bypass line 24 (101').

When the feed is supplied to the reaction unit 30, hydrogenation in the reaction unit 30 is performed in a closed system, as previously described. At this time, the pressure in the reaction unit 30 is measured by the pressure measurement unit 31.

When there is no change in the pressure in the reaction unit 30, which means that the hydrogenation is in equilibrium, the reaction unit 30 is opened, and a product in the reaction unit 30 is discharged to the storage unit 50 (103).

Subsequently, the hydrogen storage material supply unit 60 and the reaction unit 30 communicate with each other, a new hydrogen storage material is supplied to the reaction unit 30 (104), and the above process is repeated.

FIG. 3 is a reference view illustrating the hydrogen purification/storage apparatus and method in the case in which the pressure of a feed supplied from the hydrogen supply unit 10 is lower than a predetermined value.

First, a feed is supplied from the hydrogen supply unit 10 to the compressor 40 via the first hydrogen supply line 21 (201).

The compressor 40 compresses the feed and supplies the feed to the third hydrogen supply line 23 (202). At this time, the extent to which the feed is compressed by the compressor 40 is not particularly restricted. The feed may be compressed to the extent to which the pressure of the reaction unit 30 satisfies the above pressure range when the feed is supplied to the reaction unit 30.

The feed introduced into the third hydrogen supply line 23 is supplied to the reaction unit 30 via the buffer tank 90 (203). The buffer tank 90 is configured to offset excessive pressure of the feed.

When the feed is supplied to the reaction unit 30, hydrogenation in the reaction unit 30 is performed in a closed system, as previously described. At this time, the pressure in the reaction unit 30 is measured by the pressure measurement unit 31.

When there is no change in the pressure in the reaction unit 30, which means that the hydrogenation is in equilibrium, the reaction unit 30 is opened, and a product in the reaction unit 30 is discharged to the storage unit 50 (204).

Subsequently, the hydrogen storage material supply unit 60 and the reaction unit 30 communicate with each other, a new hydrogen storage material is supplied to the reaction unit 30 (205), and the above process is repeated.

Figure 4:
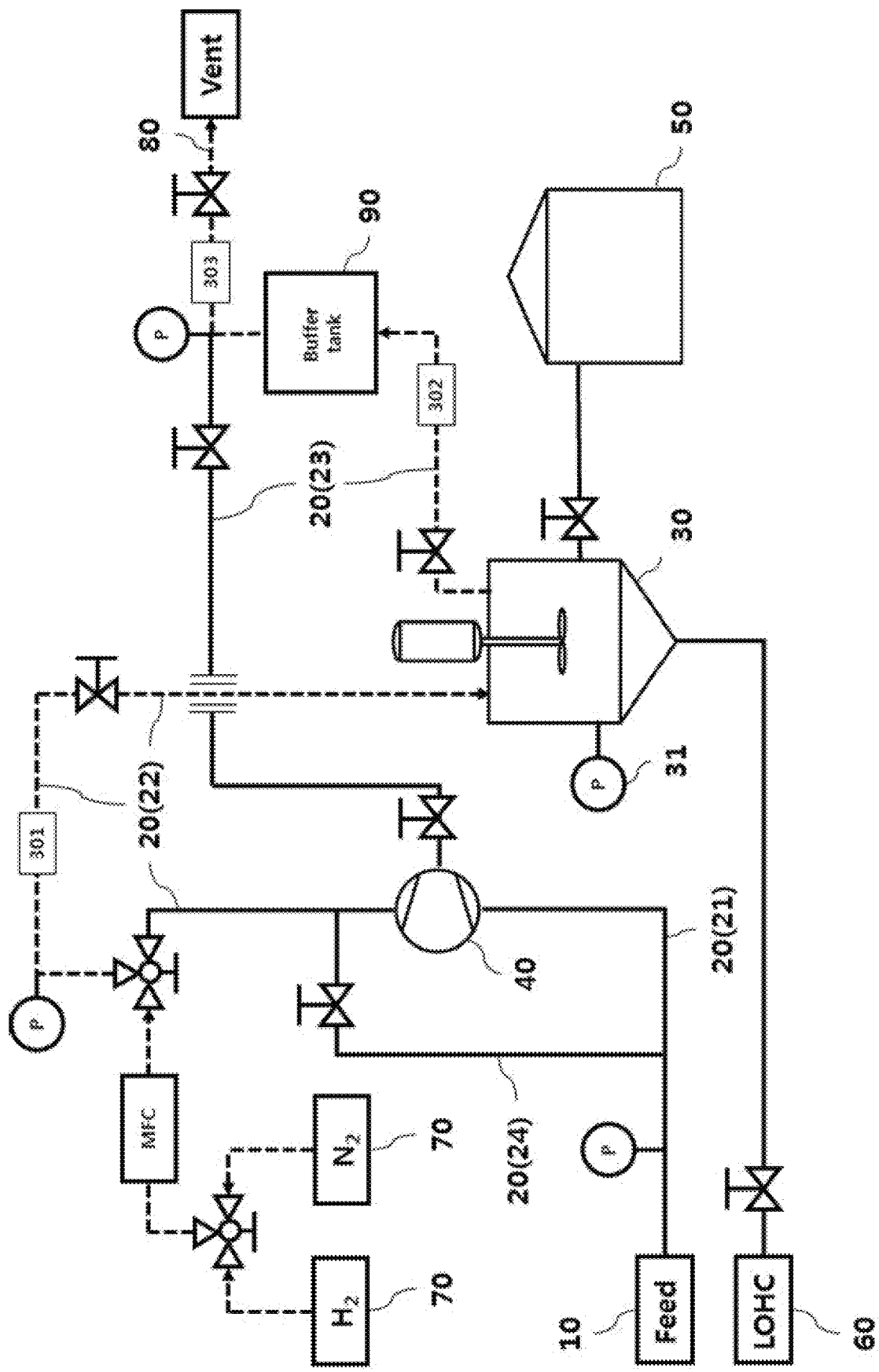
FIG. 4 is a reference view illustrating a purge process in the hydrogen purification/storage apparatus and method according to the present invention.

FIG. 4 is a reference view illustrating a purge process of removing gas remaining in the reaction unit 30 when the hydrogen purification/storage apparatus is operated for the first time or before a new batch is commenced.

A purge gas supplied from the purge gas supply unit 70 is introduced into the reaction unit 30 via the second hydrogen supply line 22 (301).

The purge gas and residual gas in the reaction unit 30 pushed thereby are discharged through the third hydrogen supply line 23 (302). The purge gas and the residual gas pass through the buffer tank 90, by which the pressure of the purge gas and the residual gas is increased, and are discharged to the outside through the purge gas discharge line 80 communicating with the third hydrogen supply line 23 (303).

The processes described with reference to FIGS. 2 to 4 may be realized by opening and closing a valve installed in each line. The valve may be automatically or manually opened and closed.

Hereinafter, the present invention will be described in more detail based on concrete examples. However, these examples are provided only for illustrating the present invention, and the scope of the present invention is not limited thereby.

A mixed gas including about 75 mol % of hydrogen ($H_2$) and about 25 mol % of nitrogen ($N_2$) was used as a feed, and hydrogen was stored through the processes shown in FIGS. 2 and 3. At this time, biphenyl dissolved in diphenylmethane was used as a hydrogen storage material, and Ru/$Al_2O_3$ was used as a catalyst. In addition, the reaction unit 30 was operated at about 120° C. and about 30 bar.

The pressure in the reaction unit 30 was measured in real time, and ingredients of the gas remaining in the reaction unit 30 when there was no change in pressure as the result of hydrogenation being in equilibrium were measured by gas chromatography (GC).

Figure 5:
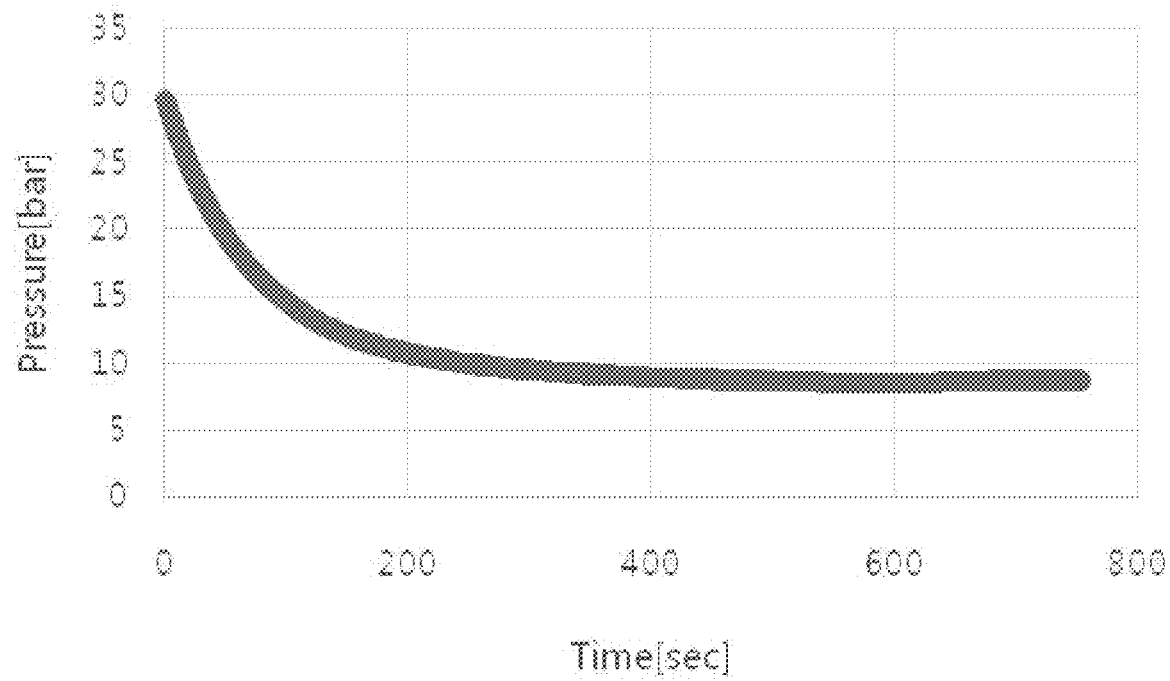
FIG. 5 is a graph showing the profile of pressure in a reaction unit when hydrogen is stored using a process of FIG. 2.

FIG. 5 is a graph showing the profile of pressure in the reaction unit 30 when hydrogen is stored using the process of FIG. 2. Ingredients of the gas remaining in the reaction unit 30 when there was no change in internal pressure of the reaction unit 30 are shown in Table 1 below.

TABLE 1

| Classification | Hydrogen [mol %] | Nitrogen [mol %] |
|---|---|---|
| Feed | 75 | 25 |
| Residual gas | 18 | 82 |

Figure 6:
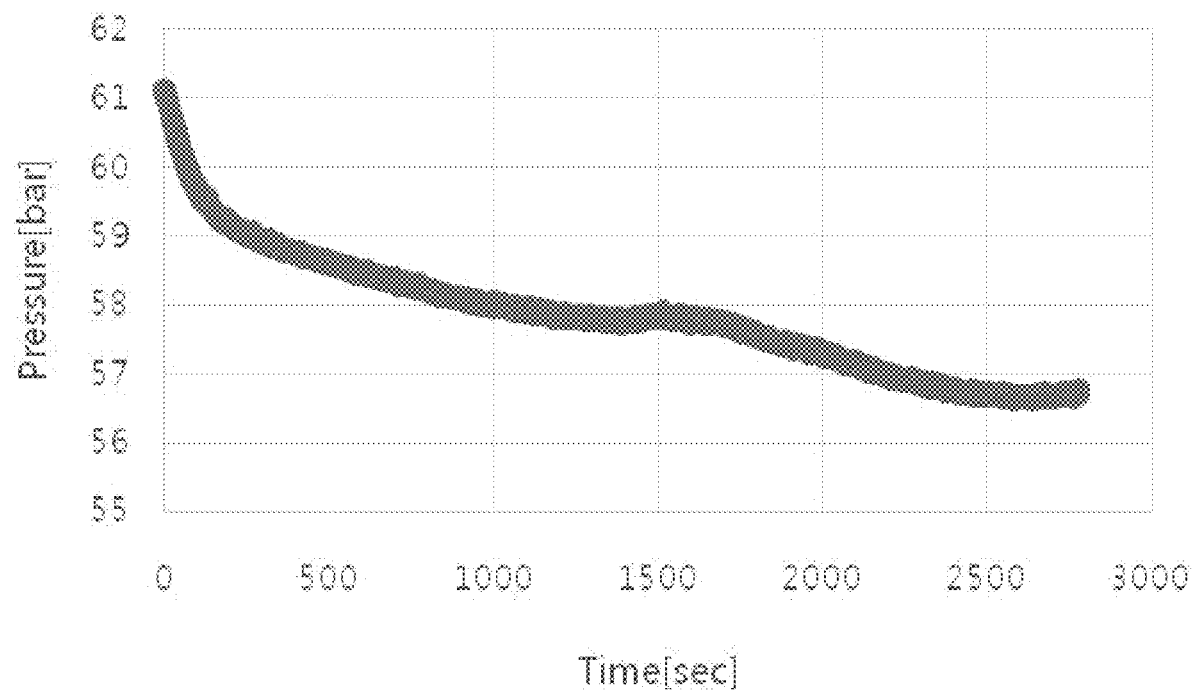
FIG. 6 is a graph showing the profile of pressure in the reaction unit when hydrogen is stored using a process of FIG. 3.

FIG. 6 is a graph showing the profile of pressure in the reaction unit 30 when hydrogen is stored using the process of FIG. 3. Ingredients of the gas remaining in the reaction unit 30 when there was no change in internal pressure of the reaction unit 30 are shown in Table 2 below.

TABLE 2

| Classification | Hydrogen [mol %] | Nitrogen [mol %] |
|---|---|---|
| Feed | 75 | 25 |
| Residual gas | 13.36 | 86.64 |

Referring to Table 1 and Table 2 above, it can be seen that mol % of the hydrogen included in the residual gas after hydrogenation is finished was remarkably reduced, whereby most of the hydrogen in the feed was stored in the hydrogen storage material.

As is apparent from the foregoing, the hydrogen purification/storage apparatus and method according to the present invention are capable of economically storing a large amount of hydrogen, whereby it is possible to secure price competitiveness of hydrogen provided to consumers.

The hydrogen purification/storage apparatus and method according to the present invention are capable of using by-product hydrogen including hydrocarbon without change in addition to pure hydrogen, whereby it is possible to further simplify the process.

The effects of the present invention are not limited to those mentioned above. It should be understood that the effects of the present invention include all effects that can be inferred from the foregoing description of the present invention.

The embodiments of the present invention have been described with reference to the accompanying drawings. However, it will be apparent to those skilled in the art that the present invention may be embodied in specific forms other than those set forth herein without departing from the spirit and essential characteristics of the present invention. Therefore, the above embodiments should be construed in all aspects as illustrative and not restrictive.

What is claimed is:

1. A hydrogen purification and storage apparatus comprising:
   a hydrogen supply unit;
   a reaction unit connected to the hydrogen supply unit via a hydrogen supply line, the reaction unit comprising a hydrogen storage material and a catalyst configured to accelerate hydrogenation of the hydrogen storage material; and
   a compressor installed in the hydrogen supply line, the compressor being configured to compress hydrogen supplied from the hydrogen supply unit, wherein
   the hydrogen storage material comprises a liquid organic hydrogen carrier (LOHC);
   wherein the hydrogen supply line comprises:
   a first hydrogen supply line configured to interconnect the hydrogen supply unit and the compressor;
   a second hydrogen supply line configured to interconnect the compressor and the reaction unit; and
   a third hydrogen supply line configured to interconnect the compressor and the reaction unit along a path different from a path of the second hydrogen supply line, the third hydrogen supply line having a buffer tank.

2. The hydrogen purification and storage apparatus according to claim 1, wherein the hydrogen supply unit supplies pure hydrogen or a mixed gas comprising hydrogen and an impurity selected from a group consisting of nitrogen ($N_2$), carbon oxide, hydrocarbon, oxygen ($O_2$), and a combination thereof.

3. The hydrogen purification and storage apparatus according to claim 1, further comprising no purification unit.

4. The hydrogen purification and storage apparatus according to claim 1, wherein the hydrogen supply line further comprises a bypass line configured to interconnect the first hydrogen supply line and the second hydrogen supply line, the bypass line being configured to bypass the compressor.

5. The hydrogen purification and storage apparatus according to claim 1, wherein, when pressure of hydrogen supplied from the hydrogen supply unit is equal to or higher than a predetermined pressure value, a valve installed in each of the first hydrogen supply line and the second hydrogen supply line is opened such that the hydrogen is supplied to the first hydrogen supply line and the second hydrogen supply line.

6. The hydrogen purification and storage apparatus according to claim 1, wherein, when pressure of hydrogen supplied from the hydrogen supply unit is lower than a predetermined pressure value, the compressor compresses the hydrogen and supplies the compressed hydrogen, and a valve installed in each of the first hydrogen supply line and the third hydrogen supply line is opened such that the compressed hydrogen is supplied to the first hydrogen supply line and the third hydrogen supply line.

7. The hydrogen purification and storage apparatus according to claim 1, wherein the liquid organic hydrogen carrier (LOHC) comprises any one selected from a group consisting of biphenyl dissolved in diphenylmethane, N-ethylcarbazole, dibenzyl toluene, toluene, and a combination thereof.

8. The hydrogen purification and storage apparatus according to claim 1, wherein the catalyst comprises a catalyst metal selected from a group consisting of ruthenium (Ru), nickel (Ni), palladium (Pd), platinum (Pt), and a combination thereof.

9. The hydrogen purification and storage apparatus according to claim 1, wherein the reaction unit is operated at a temperature of 20° C. to 150° C. and a pressure of 10 bar to 50 bar.

10. The hydrogen purification and storage apparatus according to claim 1, wherein a reaction between the hydrogen storage material and the hydrogen in the reaction unit is performed in a closed system.

11. The hydrogen purification and storage apparatus according to claim 1, further comprising a pressure measurement unit installed at the reaction unit, the pressure measurement unit being configured to measure pressure of the reaction unit.

12. The hydrogen purification and storage apparatus according to claim 1, further comprising a storage unit connected to the reaction unit, the storage unit being configured to store a product in the reaction unit.

13. The hydrogen purification and storage apparatus according to claim 1, further comprising a hydrogen storage material supply unit connected to the reaction unit, the hydrogen storage material supply unit being configured to supply the hydrogen storage material to the reaction unit.

14. The hydrogen purification and storage apparatus according to claim 1, further comprising:
a purge gas supply unit communicating with the second hydrogen supply line, the purge gas supply unit being configured to supply a purge gas to the reaction unit, wherein
residual gas in the reaction unit is discharged outside via the third hydrogen supply line and a purge gas discharge line communicating therewith by the purge gas.

15. A hydrogen purification and storage method using the hydrogen purification and storage apparatus according to claim 1, wherein the hydrogen purification and storage method comprises reacting hydrogen supplied from the hydrogen supply unit to the reaction unit and the hydrogen storage material in the reaction unit with each other.

16. The hydrogen purification and storage method according to claim 15, wherein
a reaction between the hydrogen storage material and the hydrogen in the reaction unit is performed in a closed system, and
when pressure in the reaction unit reaches a predetermined value, the reaction unit is opened to move a product in the reaction unit to a storage unit connected to the reaction unit.

17. The hydrogen purification and storage method according to claim 16, wherein a new hydrogen storage material is supplied to the reaction unit after the product in the reaction unit is moved to the storage unit.

18. The hydrogen purification and storage method according to claim 15, wherein, when pressure of hydrogen supplied from the hydrogen supply unit is equal to or higher than a predetermined pressure value, the hydrogen is supplied to the first hydrogen supply line and the second hydrogen supply line.

19. The hydrogen purification and storage method according to claim 16, wherein,
when pressure of hydrogen supplied from the hydrogen supply unit is lower than a predetermined pressure value, the hydrogen is compressed and supplied to the first hydrogen supply line and the third hydrogen supply line.

20. The hydrogen purification and storage method according to claim 15, further comprising injecting a purge gas into the reaction unit to discharge residual gas in the reaction unit to an outside before supplying hydrogen to the hydrogen supply unit.

* * * * *